(12) United States Patent
Celikyilmaz

(10) Patent No.: US 11,995,656 B2
(45) Date of Patent: *May 28, 2024

(54) SYSTEMS AND METHODS TO SET UP AN OPERATION AT A COMPUTER SYSTEM CONNECTED WITH A PLURALITY OF COMPUTER SYSTEMS VIA A COMPUTER NETWORK USING A ROUND TRIP COMMUNICATION OF AN IDENTIFIER OF THE OPERATION

(71) Applicant: Visa International Service Association, San Francisco, CA (US)

(72) Inventor: Ilker Celikyilmaz, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,336

(22) Filed: Nov. 18, 2021

(65) Prior Publication Data

US 2022/0076257 A1 Mar. 10, 2022

Related U.S. Application Data

(63) Continuation of application No. 14/877,126, filed on Oct. 7, 2015.

(Continued)

(51) Int. Cl.
*G06Q 20/12* (2012.01)
*G06Q 20/10* (2012.01)
(Continued)

(52) U.S. Cl.
CPC ......... *G06Q 20/4016* (2013.01); *G06Q 20/10* (2013.01); *G06Q 20/12* (2013.01);
(Continued)

(58) Field of Classification Search
CPC .... G06Q 30/0207; G06Q 20/10; G06Q 20/12; G06Q 20/40; H04L 67/02; H04L 67/563
See application file for complete search history.

(56) References Cited

U.S. PATENT DOCUMENTS

| 4,613,904 A | 9/1986 | Lurie |
| 5,401,946 A | 3/1995 | Neinblatt |

(Continued)

FOREIGN PATENT DOCUMENTS

| EP | 2821951 A1 * | 1/2015 | ............. G06Q 30/02 |
| JP | 2000357204 A | 12/2000 | |

(Continued)

OTHER PUBLICATIONS

Griffis, Linking Order Fulfillment Performance to Referrals in Online Retailing: An Empirical Analysis, Journal of business logistics, 2012, vol. 33 (4), p. 279-294.*

(Continued)

*Primary Examiner* — Ilse I Immanuel
(74) *Attorney, Agent, or Firm* — The Webb Law Firm

(57) ABSTRACT

Systems and methods to activate the processing of an allocated resource in operations with a processing system by the use of a round trip communication of the identifier of the resource, in which the resource identifier is communicated from a portal of the processing system to a first website, which passes the resource identifier to a second website during forwarding or redirecting a web browser from the first website to the second website, where the second website provides the resource identifier back to the processing system in communications with the processing system for operations required for the activation of the resource. Upon activation, the resource is processed during a communication session between the first website and the portal (or the processing system).

10 Claims, 7 Drawing Sheets

Related U.S. Application Data

(60) Provisional application No. 62/068,230, filed on Oct. 24, 2014.

(51) Int. Cl.
*G06Q 20/40* (2012.01)
*G06Q 30/0207* (2023.01)
*H04L 61/45* (2022.01)
*H04L 67/02* (2022.01)
*H04L 67/146* (2022.01)
*H04L 67/563* (2022.01)

(52) U.S. Cl.
CPC .......... *H04L 61/457* (2022.05); *H04L 67/02* (2013.01); *H04L 67/146* (2013.01); *H04L 67/563* (2022.05); *G06Q 30/0207* (2013.01)

(56) References Cited

U.S. PATENT DOCUMENTS

| | | | |
|---|---|---|---|
| 5,473,143 A | 12/1995 | Vak et al. | |
| 5,592,560 A | 1/1997 | Deaton et al. | |
| 5,604,921 A | 2/1997 | Alanara | |
| 5,621,812 A | 4/1997 | Deaton et al. | |
| 5,638,457 A | 6/1997 | Deaton et al. | |
| 5,684,990 A | 11/1997 | Boothby | |
| 5,687,322 A | 11/1997 | Deaton et al. | |
| 5,710,886 A | 1/1998 | Christensen et al. | |
| 5,745,036 A | 4/1998 | Clare | |
| 5,870,030 A | 2/1999 | DeLuca et al. | |
| 5,923,016 A | 7/1999 | Fredregill et al. | |
| 5,924,080 A | 7/1999 | Johnson | |
| 5,974,396 A | 10/1999 | Anderson et al. | |
| 6,014,635 A | 1/2000 | Harris et al. | |
| 6,035,280 A | 3/2000 | Christensen | |
| 6,067,529 A | 5/2000 | Ray et al. | |
| 6,070,147 A | 5/2000 | Harms et al. | |
| 6,119,101 A | 9/2000 | Peckover | |
| 6,216,129 B1 | 4/2001 | Eldering | |
| 6,222,914 B1 | 4/2001 | McMullin | |
| 6,282,522 B1 | 8/2001 | Davis et al. | |
| 6,285,983 B1 | 9/2001 | Jenkins | |
| 6,292,786 B1 | 9/2001 | Deaton et al. | |
| 6,298,330 B1 | 10/2001 | Gardenswartz et al. | |
| 6,307,958 B1 | 10/2001 | Deaton et al. | |
| 6,313,732 B1 | 11/2001 | DeLuca et al. | |
| 6,318,631 B1 | 11/2001 | Halperin | |
| 6,318,911 B1 | 11/2001 | Kitahara | |
| 6,321,201 B1 | 11/2001 | Dahl | |
| 6,332,126 B1 | 12/2001 | Peirce et al. | |
| 6,334,108 B1 | 12/2001 | Deaton et al. | |
| 6,334,110 B1 | 12/2001 | Walter et al. | |
| 6,377,935 B1 | 4/2002 | Deaton et al. | |
| 6,405,174 B1 * | 6/2002 | Walker ................ | G06Q 20/204 |
| | | | 705/16 |
| 6,505,046 B1 | 1/2003 | Baker | |
| 6,505,168 B1 | 1/2003 | Rothman et al. | |
| 6,519,571 B1 | 2/2003 | Guheen et al. | |
| 6,578,006 B1 | 6/2003 | Saito et al. | |
| 6,606,745 B2 | 8/2003 | Maggio | |
| 6,647,257 B2 | 11/2003 | Owensby | |
| 6,647,269 B2 | 11/2003 | Hendrey et al. | |
| 6,685,093 B2 | 2/2004 | Challa et al. | |
| 6,736,322 B2 | 5/2004 | Gobburu et al. | |
| 6,749,120 B2 | 6/2004 | Hung et al. | |
| 6,775,539 B2 | 8/2004 | Deshpande | |
| 6,856,992 B2 | 2/2005 | Britton et al. | |
| 6,877,665 B2 | 4/2005 | Challa et al. | |
| 6,901,406 B2 | 5/2005 | Nabe et al. | |
| 6,912,398 B1 | 6/2005 | Domnitz | |
| 6,922,686 B2 | 7/2005 | Okamoto et al. | |
| 6,938,022 B1 | 8/2005 | Singhal | |
| 6,941,376 B2 | 9/2005 | Mitchell et al. | |
| 6,996,560 B1 | 2/2006 | Choi et al. | |
| 7,003,476 B1 | 2/2006 | Samra et al. | |
| 7,013,286 B1 | 3/2006 | Aggarwal et al. | |
| 7,024,374 B1 | 4/2006 | Day et al. | |
| 7,024,409 B2 | 4/2006 | Iyengar | |
| 7,028,906 B2 | 4/2006 | Challa et al. | |
| 7,035,855 B1 | 4/2006 | Kilger et al. | |
| 7,039,599 B2 | 5/2006 | Merriman et al. | |
| 7,039,600 B1 | 5/2006 | Meek et al. | |
| 7,062,510 B1 | 6/2006 | Eldering | |
| 7,072,847 B2 | 7/2006 | Ulenas et al. | |
| 7,107,249 B2 | 9/2006 | Dively et al. | |
| 7,120,590 B1 | 10/2006 | Eisen et al. | |
| 7,158,943 B2 | 1/2007 | van der Riet | |
| 7,158,955 B2 | 1/2007 | Diveley et al. | |
| 7,165,037 B2 | 1/2007 | Lazarus et al. | |
| 7,177,822 B2 | 2/2007 | Mahmood et al. | |
| 7,181,412 B1 | 2/2007 | Fulgoni et al. | |
| 7,194,422 B1 | 3/2007 | St. John Killick | |
| 7,225,142 B1 | 5/2007 | Apte et al. | |
| 7,257,545 B1 | 8/2007 | Hung | |
| 7,260,837 B2 | 8/2007 | Abraham et al. | |
| 7,264,152 B2 | 9/2007 | Tsuei et al. | |
| 7,269,578 B2 | 9/2007 | Sweeney | |
| 7,299,194 B1 | 11/2007 | Manganaris et al. | |
| 7,308,254 B1 | 12/2007 | Rissanen | |
| 7,328,169 B2 | 2/2008 | Temares et al. | |
| 7,330,110 B1 | 2/2008 | Heintzman et al. | |
| 7,337,127 B1 | 2/2008 | Smith et al. | |
| 7,340,438 B2 | 3/2008 | Nordman et al. | |
| 7,360,251 B2 | 4/2008 | Spalink et al. | |
| 7,373,311 B2 | 5/2008 | Lambert et al. | |
| 7,395,212 B2 | 7/2008 | Juneau et al. | |
| 7,424,439 B1 | 9/2008 | Fayyad et al. | |
| 7,424,441 B2 | 9/2008 | George et al. | |
| 7,444,658 B1 | 10/2008 | Matz et al. | |
| 7,467,106 B1 | 12/2008 | Evine et al. | |
| 7,490,052 B2 | 2/2009 | Kilger et al. | |
| 7,493,655 B2 | 2/2009 | Brown | |
| 7,526,485 B2 | 4/2009 | Hagan et al. | |
| 7,529,687 B1 | 5/2009 | Phan | |
| 7,533,038 B2 | 5/2009 | Blume et al. | |
| 7,536,360 B2 | 5/2009 | Stolfo et al. | |
| 7,552,069 B2 | 6/2009 | Kepecs | |
| 7,562,030 B1 | 7/2009 | Shapira et al. | |
| 7,578,435 B2 | 8/2009 | Suk | |
| 7,613,628 B2 | 11/2009 | Ariff et al. | |
| 7,668,785 B1 | 2/2010 | Hammad | |
| 7,729,977 B2 | 6/2010 | Xiao et al. | |
| 7,779,160 B1 | 8/2010 | Symonds et al. | |
| 7,792,518 B2 | 9/2010 | Trioano et al. | |
| 7,831,470 B1 * | 11/2010 | Walker ................... | G06Q 30/00 |
| | | | 705/14.1 |
| 7,844,512 B2 | 11/2010 | Richards et al. | |
| 7,937,291 B2 | 5/2011 | Carlson et al. | |
| 7,970,705 B2 | 6/2011 | Patterson | |
| 8,019,685 B2 | 9/2011 | Patterson | |
| 8,099,318 B2 | 1/2012 | Moukas et al. | |
| 8,103,588 B2 | 1/2012 | Patterson | |
| 8,229,819 B2 | 7/2012 | Ransom et al. | |
| 8,311,845 B2 | 11/2012 | Vengroff et al. | |
| 8,341,038 B1 | 12/2012 | Rolf et al. | |
| 8,478,692 B2 | 7/2013 | Carlson et al. | |
| 8,504,692 B1 | 8/2013 | Henderson | |
| 8,556,169 B2 | 10/2013 | Maw | |
| 2001/0027413 A1 | 10/2001 | Bhutta | |
| 2001/0049620 A1 | 12/2001 | Blasko | |
| 2001/0054003 A1 | 12/2001 | Chien et al. | |
| 2002/0002597 A1 | 1/2002 | Morrell, Jr. | |
| 2002/0004733 A1 | 1/2002 | Addante | |
| 2002/0004754 A1 | 1/2002 | Garedenswartz et al. | |
| 2002/0026348 A1 | 2/2002 | Fowler et al. | |
| 2002/0042738 A1 | 4/2002 | Srinivasan et al. | |
| 2002/0046187 A1 | 4/2002 | Vargas et al. | |
| 2002/0053076 A1 | 5/2002 | Landesmann | |
| 2002/0055933 A1 * | 5/2002 | Feathers ................ | G06Q 30/02 |
| 2002/0059100 A1 | 5/2002 | Shore | |
| 2002/0060246 A1 | 5/2002 | Gobburu et al. | |
| 2002/0065713 A1 | 5/2002 | Awada et al. | |
| 2002/0065723 A1 | 5/2002 | Anderson et al. | |
| 2002/0070278 A1 | 6/2002 | Hung et al. | |

(56) References Cited

U.S. PATENT DOCUMENTS

| | | |
|---|---|---|
| 2002/0077871 A1 | 6/2002 | Udelhoven et al. |
| 2002/0082918 A1 | 6/2002 | Warwick |
| 2002/0091569 A1 | 7/2002 | Kitaura et al. |
| 2002/0099649 A1 | 7/2002 | Lee et al. |
| 2002/0102993 A1 | 8/2002 | Hendrey et al. |
| 2002/0103703 A1 | 8/2002 | Spetalnick |
| 2002/0112159 A1 | 8/2002 | Platt |
| 2002/0123928 A1 | 9/2002 | Eldering et al. |
| 2002/0128916 A1 | 9/2002 | Beinecke |
| 2002/0138346 A1 | 9/2002 | Kodaka et al. |
| 2002/0174013 A1 | 11/2002 | Freeman et al. |
| 2003/0046153 A1 | 3/2003 | Robibero |
| 2003/0047602 A1 | 3/2003 | Tida et al. |
| 2003/0058261 A1 | 3/2003 | Challa et al. |
| 2003/0093314 A1 | 5/2003 | Leung et al. |
| 2003/0191832 A1 | 10/2003 | Satyavolu et al. |
| 2003/0212595 A1 | 11/2003 | Antonucci |
| 2003/0225618 A1 | 12/2003 | Hessburg et al. |
| 2003/0230630 A1 | 12/2003 | Whipple et al. |
| 2003/0233251 A1 | 12/2003 | Haskell et al. |
| 2004/0019518 A1 | 1/2004 | Abraham et al. |
| 2004/0054575 A1 | 3/2004 | Marshall |
| 2004/0054581 A1 | 3/2004 | Redford et al. |
| 2004/0054591 A1 | 3/2004 | Spaeth et al. |
| 2004/0093512 A1 | 5/2004 | Sample |
| 2004/0122735 A1 | 6/2004 | Meshkin |
| 2004/0144839 A1 | 7/2004 | Warwick |
| 2004/0148224 A1 | 7/2004 | Gauthier et al. |
| 2004/0167815 A1 | 8/2004 | DeLaHunt |
| 2004/0193685 A1 | 9/2004 | Proehl |
| 2004/0225509 A1 | 11/2004 | Andre |
| 2004/0225603 A1 | 11/2004 | Allen et al. |
| 2004/0267611 A1 | 12/2004 | Hoerenz |
| 2005/0055275 A1 | 3/2005 | Newman et al. |
| 2005/0071225 A1 | 3/2005 | Bortolin et al. |
| 2005/0071227 A1 | 3/2005 | Hammad et al. |
| 2005/0071235 A1 | 3/2005 | Nguyen et al. |
| 2005/0075932 A1 | 4/2005 | Mankoff |
| 2005/0125342 A1 | 6/2005 | Schiff |
| 2005/0131761 A1 | 6/2005 | Trika et al. |
| 2005/0133590 A1 | 6/2005 | Rettenmyer et al. |
| 2005/0144074 A1 | 6/2005 | Fredregill et al. |
| 2005/0160002 A1 | 7/2005 | Roetter et al. |
| 2005/0210240 A1 | 9/2005 | Barron |
| 2005/0210387 A1 | 9/2005 | Alagappan et al. |
| 2005/0216334 A1 | 9/2005 | Mehrabani-Farsi |
| 2005/0216823 A1 | 9/2005 | Petersen et al. |
| 2005/0240474 A1 | 10/2005 | Li |
| 2005/0242179 A1 | 11/2005 | Warwick |
| 2005/0267812 A1 | 12/2005 | Jensen et al. |
| 2006/0002189 A1 | 1/2006 | Berkman |
| 2006/0004613 A1 | 1/2006 | Roller et al. |
| 2006/0053056 A1 | 3/2006 | Alspach-Goss et al. |
| 2006/0085260 A1 | 4/2006 | Yamagishi |
| 2006/0085263 A1 | 4/2006 | Greer et al. |
| 2006/0111967 A1 | 5/2006 | Forbes |
| 2006/0122921 A1 | 6/2006 | Comerford et al. |
| 2006/0131390 A1 | 6/2006 | Kim |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190337 A1 | 8/2006 | Ayers et al. |
| 2006/0212900 A1 | 9/2006 | Ismail et al. |
| 2006/0235746 A1 | 10/2006 | Hammond et al. |
| 2006/0289631 A1 | 12/2006 | Stretch et al. |
| 2006/0293948 A1 | 12/2006 | Weinblatt |
| 2006/0293959 A1 | 12/2006 | Hogan |
| 2007/0022048 A1 | 1/2007 | Kingsborough et al. |
| 2007/0038516 A1 | 2/2007 | Apple et al. |
| 2007/0045405 A1 | 3/2007 | Rothschild |
| 2007/0055597 A1 | 3/2007 | Patel et al. |
| 2007/0067267 A1 | 3/2007 | Ives |
| 2007/0067297 A1 | 3/2007 | Kublickis |
| 2007/0084917 A1 | 4/2007 | Fajkowski |
| 2007/0100691 A1 | 5/2007 | Patterson |
| 2007/0106556 A1 | 5/2007 | Edwards et al. |
| 2007/0124201 A1 | 5/2007 | Hu et al. |
| 2007/0136131 A1 | 6/2007 | Mankoff |
| 2007/0156470 A1 | 7/2007 | Granucci et al. |
| 2007/0162377 A1 | 7/2007 | Williams |
| 2007/0174295 A1 | 7/2007 | Abraham et al. |
| 2007/0192121 A1 | 8/2007 | Routson |
| 2007/0192122 A1 | 8/2007 | Routson et al. |
| 2007/0208671 A1 | 9/2007 | Brown et al. |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226061 A1 | 9/2007 | Chen et al. |
| 2007/0239521 A1 | 10/2007 | Khadpe et al. |
| 2007/0239532 A1 | 10/2007 | Benson et al. |
| 2007/0241189 A1 | 10/2007 | Slavin et al. |
| 2007/0244741 A1 | 10/2007 | Blume et al. |
| 2007/0260736 A1 | 11/2007 | Miller |
| 2007/0265920 A1 | 11/2007 | Bistriceanu et al. |
| 2007/0265921 A1 | 11/2007 | Rempe et al. |
| 2007/0265923 A1 | 11/2007 | Krassner et al. |
| 2007/0282681 A1 | 12/2007 | Shubert et al. |
| 2008/0004884 A1 | 1/2008 | Flake et al. |
| 2008/0021784 A1 | 1/2008 | Hessburg et al. |
| 2008/0021785 A1 | 1/2008 | Hessburg et al. |
| 2008/0027810 A1 | 1/2008 | Lemer et al. |
| 2008/0040229 A1 | 2/2008 | Gholston |
| 2008/0040270 A1 | 2/2008 | Buchheit et al. |
| 2008/0059302 A1 | 3/2008 | Fordyce III et al. |
| 2008/0059303 A1 | 3/2008 | Fordyce |
| 2008/0059306 A1 | 3/2008 | Fordyce et al. |
| 2008/0059307 A1 | 3/2008 | Fordyce III et al. |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0082393 A1 | 4/2008 | Ozzie et al. |
| 2008/0082418 A1 | 4/2008 | Fordyce et al. |
| 2008/0097801 A1 | 4/2008 | MacLellan et al. |
| 2008/0103887 A1 | 5/2008 | Oldham et al. |
| 2008/0103968 A1 | 5/2008 | Bies et al. |
| 2008/0109335 A1 | 5/2008 | Keohane et al. |
| 2008/0120182 A1 | 5/2008 | Arnold et al. |
| 2008/0120214 A1 | 5/2008 | Steele et al. |
| 2008/0120218 A1 | 5/2008 | Reid et al. |
| 2008/0133345 A1 | 6/2008 | Cordery et al. |
| 2008/0133351 A1* | 6/2008 | White .................. G07G 1/14 705/14.27 |
| 2008/0133366 A1 | 6/2008 | Evans et al. |
| 2008/0134228 A1 | 6/2008 | Dion et al. |
| 2008/0147496 A1 | 6/2008 | Bal et al. |
| 2008/0150678 A1 | 6/2008 | Giobbi et al. |
| 2008/0154654 A1 | 6/2008 | Niessen et al. |
| 2008/0154703 A1 | 6/2008 | Flake et al. |
| 2008/0154704 A1 | 6/2008 | Flake et al. |
| 2008/0154727 A1 | 6/2008 | Carlson |
| 2008/0162258 A1 | 7/2008 | Kala et al. |
| 2008/0162269 A1 | 7/2008 | Gilbert |
| 2008/0163257 A1 | 7/2008 | Carlson et al. |
| 2008/0167000 A1 | 7/2008 | Wentker et al. |
| 2008/0167961 A1 | 7/2008 | Wentker et al. |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0183480 A1 | 7/2008 | Carlson et al. |
| 2008/0184117 A1 | 7/2008 | Alsbury et al. |
| 2008/0195465 A1 | 8/2008 | Redmond et al. |
| 2008/0195466 A1 | 8/2008 | Wright |
| 2008/0195473 A1 | 8/2008 | Laramy et al. |
| 2008/0201226 A1 | 8/2008 | Carlson et al. |
| 2008/0201472 A1 | 8/2008 | Bistriceanu et al. |
| 2008/0215429 A1 | 9/2008 | Ramer et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0222038 A1 | 9/2008 | Eden et al. |
| 2008/0228563 A1 | 9/2008 | Zellner et al. |
| 2008/0228582 A1 | 9/2008 | Fordyce et al. |

(56) References Cited

U.S. PATENT DOCUMENTS

| | | |
|---|---|---|
| 2008/0235091 A1 | 9/2008 | Holliday |
| 2008/0235243 A1 | 9/2008 | Lee et al. |
| 2008/0242317 A1 | 10/2008 | Abhyanker |
| 2008/0248815 A1 | 10/2008 | Busch |
| 2008/0262915 A1 | 10/2008 | Gojkovic et al. |
| 2008/0262935 A1 | 10/2008 | Baumgartner et al. |
| 2008/0300973 A1 | 12/2008 | DeWitt et al. |
| 2008/0313011 A1 | 12/2008 | Rose et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0319889 A1 | 12/2008 | Hammad |
| 2008/0320512 A1 | 12/2008 | Knight |
| 2009/0006183 A1 | 1/2009 | Paintin et al. |
| 2009/0006203 A1 | 1/2009 | Fordyce et al. |
| 2009/0006363 A1 | 1/2009 | Canny et al. |
| 2009/0018895 A1 | 1/2009 | Weinblatt et al. |
| 2009/0030793 A1 | 1/2009 | Fordyce, III |
| 2009/0043593 A1 | 2/2009 | Herbrich et al. |
| 2009/0070207 A1 | 3/2009 | Engel et al. |
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0076925 A1 | 3/2009 | DeWitt et al. |
| 2009/0081990 A1 | 3/2009 | Granucci et al. |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0132347 A1 | 5/2009 | Anderson et al. |
| 2009/0132365 A1 | 5/2009 | Gruenhagen et al. |
| 2009/0132366 A1 | 5/2009 | Lam et al. |
| 2009/0144201 A1 | 6/2009 | Gierkink et al. |
| 2009/0150211 A1 | 6/2009 | Bayne |
| 2009/0157511 A1 | 6/2009 | Spinnell et al. |
| 2009/0171747 A1 | 7/2009 | Lanning et al. |
| 2009/0172551 A1 | 7/2009 | Kane et al. |
| 2009/0172728 A1 | 7/2009 | Shkedi et al. |
| 2009/0182634 A1 | 7/2009 | Park et al. |
| 2009/0192882 A1 | 7/2009 | Narahashi et al. |
| 2009/0203387 A1 | 8/2009 | Wold et al. |
| 2009/0216579 A1 | 8/2009 | Zen et al. |
| 2009/0216616 A1 | 8/2009 | Wang et al. |
| 2009/0222323 A1 | 9/2009 | Kelly et al. |
| 2009/0222348 A1 | 9/2009 | Ransom et al. |
| 2009/0234708 A1 | 9/2009 | Heiser et al. |
| 2009/0234711 A1 | 9/2009 | Ramer et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0271262 A1 | 10/2009 | Hammad |
| 2009/0271275 A1 | 10/2009 | Regmi et al. |
| 2009/0271305 A1 | 10/2009 | Lal et al. |
| 2009/0271327 A1 | 10/2009 | Lal et al. |
| 2009/0276304 A1 | 11/2009 | Dorr |
| 2009/0276305 A1* | 11/2009 | Clopp ............... G06Q 30/0214 705/14.16 |
| 2009/0299941 A1 | 12/2009 | McColgan et al. |
| 2009/0327151 A1 | 12/2009 | Carlson et al. |
| 2010/0017275 A1 | 1/2010 | Carlson et al. |
| 2010/0030688 A1 | 2/2010 | Patterson |
| 2010/0049588 A1 | 2/2010 | Debow |
| 2010/0049620 A1 | 2/2010 | Debow |
| 2010/0057549 A1 | 3/2010 | Boal |
| 2010/0057553 A1 | 3/2010 | Ameiss et al. |
| 2010/0082420 A1 | 4/2010 | Trifiletti et al. |
| 2010/0106568 A1 | 4/2010 | Grimes |
| 2010/0106569 A1 | 4/2010 | Grimes |
| 2010/0106570 A1 | 4/2010 | Radu et al. |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0125490 A1 | 5/2010 | Kiciman et al. |
| 2010/0125737 A1 | 5/2010 | Kang |
| 2010/0138838 A1 | 6/2010 | Lin et al. |
| 2010/0145786 A1 | 6/2010 | Fordyce III et al. |
| 2010/0161404 A1 | 6/2010 | Taylor et al. |
| 2010/0174596 A1 | 7/2010 | Gilman et al. |
| 2010/0174623 A1 | 7/2010 | McPhie et al. |
| 2010/0176193 A1 | 7/2010 | Maw |
| 2010/0211694 A1 | 8/2010 | Razmov et al. |
| 2010/0268588 A1 | 10/2010 | Lal et al. |
| 2010/0274566 A1 | 10/2010 | Carlson |
| 2010/0274625 A1 | 10/2010 | Carlson |
| 2010/0274627 A1 | 10/2010 | Carlson |
| 2010/0274653 A1 | 10/2010 | Hammad |
| 2010/0274691 A1 | 10/2010 | Hammad et al. |
| 2010/0274853 A1 | 10/2010 | Carlson et al. |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280914 A1 | 11/2010 | Carlson |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2010/0312692 A1 | 12/2010 | Teicher |
| 2010/0325047 A1 | 12/2010 | Carlson et al. |
| 2010/0325048 A1 | 12/2010 | Carlson et al. |
| 2011/0016050 A1 | 1/2011 | Evans |
| 2011/0022448 A1 | 1/2011 | Strock et al. |
| 2011/0029363 A1 | 2/2011 | Gillenson et al. |
| 2011/0029440 A1 | 2/2011 | Motoyama et al. |
| 2011/0029595 A1 | 2/2011 | Thayer et al. |
| 2011/0054981 A1 | 3/2011 | Faith et al. |
| 2011/0066483 A1 | 3/2011 | Salmon et al. |
| 2011/0087531 A1 | 4/2011 | Winters et al. |
| 2011/0125509 A1 | 5/2011 | Lidstrom et al. |
| 2011/0125565 A1 | 5/2011 | MacIlwaine et al. |
| 2011/0153438 A1 | 6/2011 | Dragt |
| 2011/0161150 A1 | 6/2011 | Steffens et al. |
| 2011/0202402 A1 | 8/2011 | Fowler et al. |
| 2011/0208575 A1 | 8/2011 | Bansal et al. |
| 2011/0231235 A1 | 9/2011 | MacIlwaine et al. |
| 2011/0231258 A1 | 9/2011 | Winters |
| 2011/0238483 A1 | 9/2011 | Yoo et al. |
| 2011/0270719 A1 | 11/2011 | Hollars et al. |
| 2011/0288906 A1 | 11/2011 | Thomas et al. |
| 2011/0288918 A1 | 11/2011 | Cervenka et al. |
| 2011/0288922 A1 | 11/2011 | Thomas et al. |
| 2011/0288924 A1 | 11/2011 | Thomas et al. |
| 2011/0288925 A1 | 11/2011 | Thomas et al. |
| 2011/0295670 A1 | 12/2011 | Thomas et al. |
| 2011/0295671 A1 | 12/2011 | Thomas et al. |
| 2011/0302011 A1 | 12/2011 | Yoder et al. |
| 2011/0307318 A1 | 12/2011 | LaPorte et al. |
| 2012/0030066 A1 | 2/2012 | Stringfellow et al. |
| 2012/0059702 A1 | 3/2012 | Yoder et al. |
| 2012/0066062 A1 | 3/2012 | Yoder et al. |
| 2012/0066064 A1 | 3/2012 | Yoder et al. |
| 2012/0072997 A1 | 3/2012 | Carlson et al. |
| 2012/0078697 A1 | 3/2012 | Carlson et al. |
| 2012/0078699 A1 | 3/2012 | Carlson et al. |
| 2012/0089461 A1 | 4/2012 | Greenspan |
| 2012/0109730 A1 | 5/2012 | Yoder et al. |
| 2012/0109734 A1 | 5/2012 | Fordyce, III et al. |
| 2012/0130859 A1 | 5/2012 | Wolfe et al. |
| 2012/0136704 A1 | 5/2012 | Carlson et al. |
| 2012/0150609 A1 | 6/2012 | Walker et al. |
| 2012/0185315 A1 | 7/2012 | VonDerheide et al. |
| 2012/0191525 A1 | 7/2012 | Singh et al. |
| 2012/0215637 A1 | 8/2012 | Hermann |
| 2012/0239498 A1 | 9/2012 | Ramer et al. |
| 2012/0244948 A1 | 9/2012 | Dhillon et al. |
| 2012/0259695 A1 | 10/2012 | Glassman et al. |
| 2012/0259842 A1 | 10/2012 | Oman et al. |
| 2012/0271689 A1 | 10/2012 | Etheredge et al. |
| 2012/0271691 A1 | 10/2012 | Hammad et al. |
| 2012/0271697 A1 | 10/2012 | Gilman et al. |

(56) References Cited

U.S. PATENT DOCUMENTS

| | | | |
|---|---|---|---|
| 2012/0271706 A1 | 10/2012 | Ransom et al. |
| 2012/0278173 A1 | 11/2012 | Vaidyanathan et al. |
| 2012/0290909 A1 | 11/2012 | Speirs et al. |
| 2012/0290950 A1 | 11/2012 | Rapaport et al. |
| 2012/0303425 A1 | 11/2012 | Katzin et al. |
| 2012/0310838 A1 | 12/2012 | Harris et al. |
| 2012/0323664 A1 | 12/2012 | Klems |
| 2013/0006709 A1 | 1/2013 | Kosta |
| 2013/0132205 A1 | 5/2013 | Harris |
| 2013/0221093 A1 | 8/2013 | Patel et al. |
| 2013/0282461 A1 | 10/2013 | Ovick et al. |
| 2014/0101095 A1 | 4/2014 | Van Riel |
| 2014/0129313 A1 | 5/2014 | Rappoport et al. |
| 2014/0214671 A1 | 7/2014 | DeSilva et al. |
| 2014/0222533 A1 | 8/2014 | Ovick et al. |
| 2014/0236672 A1 | 8/2014 | Yoder et al. |
| 2014/0324696 A1 | 10/2014 | Browne et al. |

FOREIGN PATENT DOCUMENTS

| | | | |
|---|---|---|---|
| JP | 2001501328 A | 1/2001 |
| JP | 2009501891 A | 1/2009 |
| JP | 5346930 B2 | 11/2013 |
| KR | 20010096672 A | 11/2001 |
| KR | 20030008894 A | 1/2003 |
| KR | 20040045622 A | 6/2004 |
| KR | 20040107715 A | 12/2004 |
| KR | 20050113156 A | 12/2005 |
| KR | 20070030415 A | 3/2007 |
| KR | 20080002731 A | 1/2008 |
| KR | 20080104398 A | 12/2008 |
| KR | 101024810 B1 | 3/2011 |
| KR | 20110019887 A | 3/2011 |
| RU | 122505 | 11/2012 |
| WO | 1999022328 | 12/1899 |
| WO | 1999050775 | 10/1999 |
| WO | 2000003328 A1 | 1/2000 |
| WO | 2000060435 A2 | 10/2000 |
| WO | 2000062231 A1 | 10/2000 |
| WO | 2001037183 A1 | 5/2001 |
| WO | 2001039023 A2 | 5/2001 |
| WO | 2001057758 A1 | 8/2001 |
| WO | 2001093161 A1 | 12/2001 |
| WO | 2002005116 A2 | 1/2002 |
| WO | 2002014985 A2 | 2/2002 |
| WO | 2002019229 A2 | 3/2002 |
| WO | 2002042970 A1 | 5/2002 |
| WO | 2002071187 | 9/2002 |
| WO | 2003025695 | 3/2003 |
| WO | 2003081376 | 10/2003 |
| WO | 2005001631 A2 | 1/2005 |
| WO | 2005072382 A2 | 8/2005 |
| WO | 2005076181 A1 | 8/2005 |
| WO | 2006028739 A2 | 3/2006 |
| WO | 2006052444 A2 | 5/2006 |
| WO | 2006126205 A2 | 11/2006 |
| WO | 2007131258 A1 | 11/2007 |
| WO | 2007136221 A1 | 11/2007 |
| WO | 2008013945 A2 | 1/2008 |
| WO | 2008023912 A2 | 2/2008 |
| WO | 2008055217 A2 | 5/2008 |
| WO | 2008064343 A1 | 5/2008 |
| WO | 2008067543 A2 | 6/2008 |
| WO | 2008098004 A2 | 8/2008 |
| WO | 2008144643 A1 | 11/2008 |
| WO | 2009144010 A1 | 12/2009 |
| WO | 2010036915 A2 | 4/2010 |
| WO | 2010141270 A2 | 12/2010 |
| WO | 2012040270 A2 | 3/2012 |
| WO | 2012061758 A2 | 5/2012 |
| WO | 2012069803 A1 | 5/2012 |
| WO | 2013158861 A1 | 10/2013 |

OTHER PUBLICATIONS

Cashmore, Pete, "YouTube Ads: YouHate Em," available at http://mashable.com/2009/04/05/youtube-ads-youhate-em/#, Apr. 5, 2009.
Credit Card Finder: "Airline Miles Reward Credit Cards"; http://www.plasticrewards.com/airline-miles-reward/, 2009, 2 pages.
Credit Card Finder: "Cash Back Reward Credit Cards"; http://www.plasticrewards.com/creditcard/cash-back-reward/, 2009, 3 pages.
Credit Card Finder: "Compare Cash Back Credit Cards and Credit Card Offers"; http://www.plasticrewards.com/, 2009, 1 page.
Credit Card Finder: "Gas Reward Credit Cards"; http://www.plasticrewards.com/creditcard/gas-reward/, 2009, 3 pages.
Credit Card Finder: "Hotel Reward Credit Cards"; http://www.plasticrewards.com/credit-card/hotel-reward/, 2009, 2 pages.
Credit Card Finder: "Reward Credit Cards"; http://www.plasticrewards.com/credit-card/reward/, 2009, 3 pages.
Credit Card Finder: "Travel Reward Credit Cards"; http://www.plasticrewards.com/credit-card/travel-reward, 2009, 3 pages.
CreditCardGuide.com: "Car rebate credit cards"; http://www.creditcardguide.com/car-rebate.html/, 2009, 2 page.
CreditCardGuide.com: "Cash Back Credit Cards"; http://www.creditcardguide.com/cashback2.htmll, 2009, 2 pages.
CreditCardGuide.com: "Dining and entertainment credit cards"; http://www.creditcardguide.com/dining-entertainment.html/, 2009, 3 pages.
CreditCardGuide.com: "Financial reward credit cards"; http://www.creditcardguide.com/financial-reward-credit-cards.html/, 2009, 2 pages.
CreditCardGuide.com: "Foundation and charity credit cards"; http://www.creditcardguide.com/foundations-charities.html/, 2009, 3 pages.
CreditCardGuide.com: "Gas Rebate Credit Cards"; http://www.creditcardguide.com/gascards.html/, 2009, 2 pages.
CreditCardGuide.com: "Sports and outdoor enthusiast credit cards"; http://www.creditcardguide.com/sports-outdoors.html/, 2009, 2 pages.
CreditCardGuide.com: "Use Cash Back Credit Cards"; http://www.creditcardguide.com/cashback.html/, 2009, 3 pages.
CreditCardGuide.com: "Use home improvement reward credit cards"; http://www.creditcardguide.com/home-improvement-credit-cards.html/, 2009, 2 pages.
CreditCardGuide.com: "Use hotel reward credit cards and travel reward credit cards"; http://www.creditcardguide.com/hotel-reward-credit-cards.html/, 2009, 2 pages.
CreditCardGuide.com: "Use retail reward credit cards and brand name reward credit cards"; http//www.creditcardguide.com/retail-brand-credit-cards.html/, 2009, 2 pages.
CreditCardGuide.com: "Use Reward Credit Cards"; http://www.creditcardguide.com/reward-point-credit-cards.html/, 2009, 3 pages.
CreditCardGuide.com: "With Airline Credit Cards, Frequent Flyer credit cards, and Travel Reward Credit Cards"; http://www.creditcardguide.com/airline-frequent-flyer-cards.html/, 2009,4 pages.
Li, Wen-Syan, "Knowledge Gathering and Matching in Heterogeneous Databases," Working Notes of the AAAI Spring Symposium on Information Gathering, pp. 116-1216, Mar. 27, 1995.
Mielikäinen, Taneli, "Privacy Problems with Anonymized Transaction Databases," 7th International Conference on Discovery Science, pp. 219-229, Oct. 2, 2004.
Punj, Girish et al. "Cluster Analysis in Marketing Research: Review and Suggestions for Application," Journal of Marketing Research, vol. 20, pp. 134-148, May 1983.
Stubblebine, Unlinkable serial transactions: protocols and applications, 1999, ACM Transactions on Information and System Security vol. 2 Issue Nov. 4, 1999 pp. 354-389.
Van Grove, Jennifer, "Are Your Online Video Ads Driving Actual Offline Purchases?", available at http://mashable.com/2009/05/18/video-impact/#, May 18, 2009.

* cited by examiner

SYSTEMS AND METHODS TO SET UP AN OPERATION AT A COMPUTER SYSTEM CONNECTED WITH A PLURALITY OF COMPUTER SYSTEMS VIA A COMPUTER NETWORK USING A ROUND TRIP COMMUNICATION OF AN IDENTIFIER OF THE OPERATION

RELATED APPLICATIONS

This application is a continuation of U.S. patent application Ser. No. 14/877,126, filed Oct. 7, 2015, which claims the benefit of U.S. Provisional Patent Application No. 62/068,230, filed Oct. 24, 2014, the disclosures of which are hereby incorporated by reference in their entirety.

The present application relates to U.S. Pat. App. Pub. No. 2014/0129313, entitled "Systems and Methods to Facilitate an Offer Campaign based on Transactions with Different Merchants", U.S. Pat. App. Pub. No. 2012/0078697, entitled "Systems and Methods to Program Operations for Interaction with Users," U.S. Pat. App. Pub. No. 2012/0072997, entitled "Systems and Methods to Modify Interaction Rules during Run Time," U.S. Pat. App. Pub. No. 2012/0066064, entitled "Systems and Methods to Provide Real-Time Offers via a Cooperative Database," the entire disclosures of which applications are hereby incorporated herein by reference.

FIELD OF THE TECHNOLOGY

At least some embodiments disclosed in the present application relate to the coordination of a plurality of separate computer systems connected via computer networks to set up the processing of a predetermined task at a time when a set of predetermined conditions are satisfied.

BACKGROUND

In a system having multiple computer systems connected via one or more computer networks, resources for processing a task may reside in different computer systems. The use of a predetermined communication protocol allows the computer systems to communicate with each other in a predetermined way to utilize the resources that may be distributed among the computer systems for the processing of the task. Improvements to the communication protocol can improve the performance of the system as a whole and/or improve the functionalities of the system as a whole. In some instances, improvements to the communication protocol can improve the performance of some of the individual computer systems and/or improve the functionalities of the individual computer systems.

For example, a typical electronic payment processing network has a transaction handler interconnecting a plurality of acquirer processors and a plurality of issuer processors according to an electronic communication standard. The transaction handler is generally a special purpose computer system that is substantially independent from other computer systems in the network, such as issuer processors and the acquirer processors, which are special purpose computer systems configured to control accounts from which payments are made and special purpose computer systems configured to control accounts to which the payments are made, respectively.

A typical electronic payment processing network has the capability to process certain transactions, such as credit card or debit card transactions, but may not have the capability process other transactions, such as add-on transactions (e.g., loyalty reward, benefit redemption) coupled with regular transactions.

Some recent developments provided improved electronic payment processing networks that have the improved capability to process certain add-on transactions coupled with conventional electronic payment transactions, such as those disclosed in U.S. Pat. App. Pub. No. 2014/0222533, entitled "Systems and Methods to Use Transaction Authorization Communications to Process Individualized Offers," U.S. Pat. App. Pub. No. 2013/0282461, entitled "Systems and Methods to Use Transaction Authorization Communications to Process Offers," U.S. Pat. App. Pub. No. 2013/0246150, entitled "Systems and Methods to Apply the Benefit of Offers via a Transaction Handler," U.S. Pat. App. Pub. No. 2013/0091000, entitled "Systems and Methods to Provide Discount at Point of Sales Terminals," U.S. Pat. App. Pub. No. 2013/0124287, entitled "Systems and Methods to Provide Discount at Point of Sales Terminals," and U.S. Pat. App. Pub. No. 2011/0125565, entitled "Systems and Methods for Multi-Channel Offer Redemption," the disclosures of which applications are hereby incorporated herein by reference.

There are challenges in implementing the additional capabilities with minimum impact to the performance of the core functionalities of the electronic payment processing network.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

In one embodiment disclosed herein, an identifier of a resource is propagated, using a communication portal of a processing system after the resource is allocated in the data warehouse of the processing system, to a first website, which forwards a web browser together with the identifier of the resource to a second website to perform operations with the processing system, during which operations the second web provides the identifier of the resource back to the processing system. Upon receiving the identifier of the resource back in the processing system from the second website, the processing system configures in the data warehouse the resource to be processed in connection with operations with the first website.

The use of the round trip communication of the identifier of the resource delays the configuration of the processing of the resource at a later time after the operations with the second website are performed. Thus, the processing system does not have to monitor the operations with the first website for the processing of the resource before the operations with the second website are completed. The technique at least reduces the computing workload at the processing system during the period of time between the allocation of the resource and the receiving of the identifier of the resource back from the second website, and thus improves the efficiency of the processing system.

Figure 1:
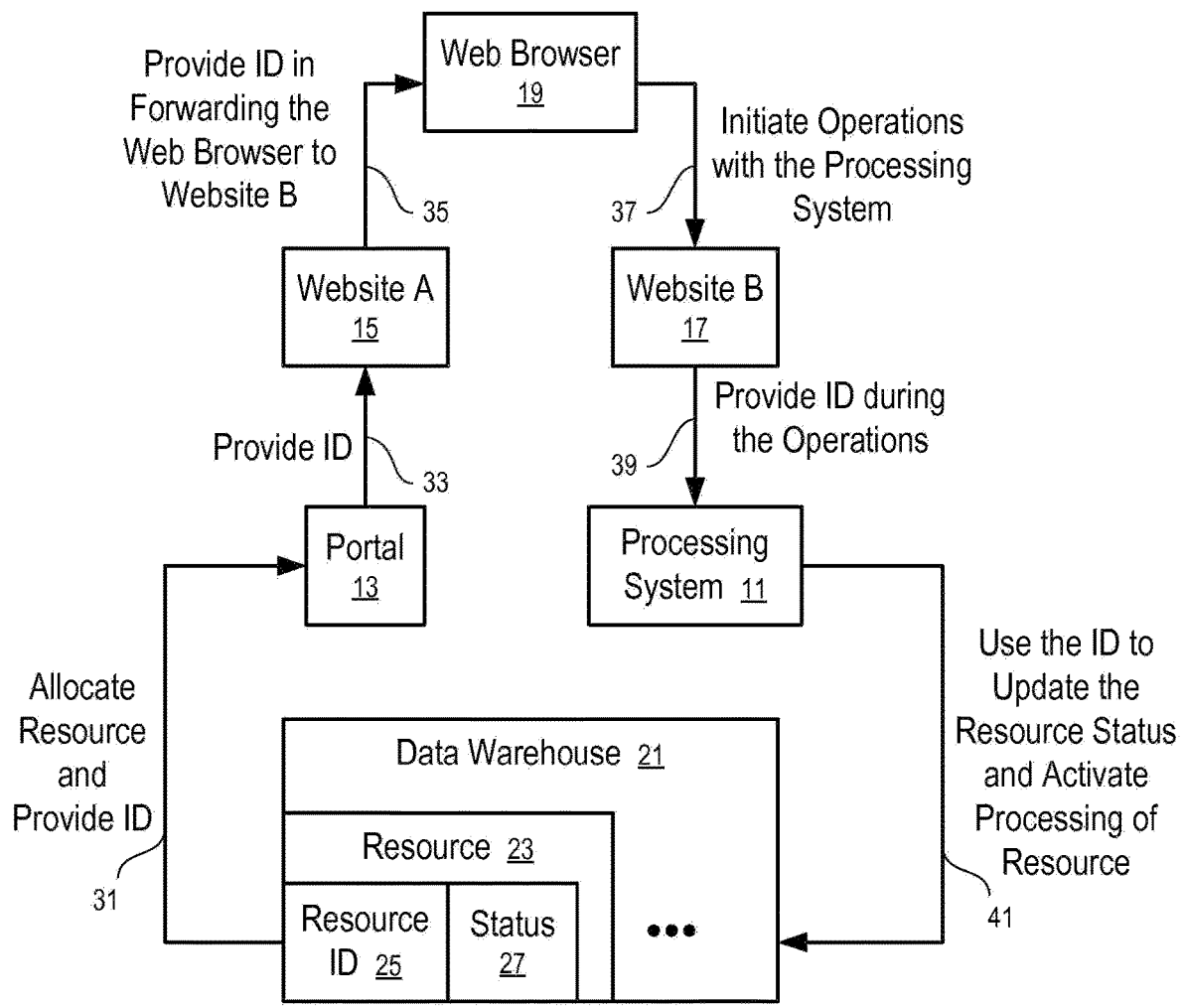
FIG. 1 shows a system configured to set up the processing of an allocated resource for processing at a time when a predetermined set of conditions are satisfied according to one embodiment.

FIG. 1 shows a system configured to set up the processing of an allocated resource for processing at a time when a predetermined set of conditions are satisfied according to one embodiment.

In FIG. 1, a processing system (11) has a communication portal (13) and a data warehouse (21).

During a communication session between the portal (13) and a website A (15), the portal (13) allocates (31) the resource (23) for processing during operations between the website A (15) and the processing system (11), scheduled after relevant operations between a website B (17) and the processing system (11). The availability of the resource (23) is presented to a web browser (19).

In FIG. 1, a resource ID (25) is assigned to represent the resource (23). The resource ID (25) is communicated from the portal (13) to the website A (15), the web browser (19), the website B (17), and back to the processing system (11) during the operations between the website B (17) and the processing system (11). After the resource ID (25) is received back in the processing system (11) during the operations between the website B (17) and the processing system (11), the status (27) is updated to activate the processing of the resource (23). Thus, the activation of the processing of the resource (23) is at least delayed for a period of time during which the resource (23) should not be processed.

In one embodiment, the portal (13) provides (33) the resource ID (25) to the website A (15) during presentation of the availability of the resource (23). The website A (15) indicates the availability of the resource (23) to the web browser (19) and forwards/redirects the web browser (19) to the website B (17). In forwarding the web browser (19) to the website B (17), the website A (15) provides (35) the resource ID (25) to the website B (17) via the web browser (19).

For example, the portal (13) and/or the website A (15) is configured in one embodiment to embed the resource ID (25) in a uniform resource locator (URL) pointing to the website B (17), such that when the web browser (19) is forwarded/redirected to the website B (17), the resource ID (25) is received in the website B (17). During the subsequent communication session between the web browser (19) and the website B(17), the web browser (19) initiates (37) the operations between the website B (17) and the processing system (11), during which the website B (17) provides (39) the resource ID (25) back to the processing system (11). In response, the processing system uses (41) the resource ID (25) to update the resource status (27) and thus activate the processing of the resource during operations between the website A (15) and the processing system (11).

In one embodiment, the processing system (11) is configured to monitor the presence of a resource ID (e.g., 25) in operation communications. If the resource ID (e.g., 25) is provided in a data field of a communication, the processing system (11) updates the data warehouse (23), or instructs the portal (13) to update the data warehouse (23).

Figure 2:
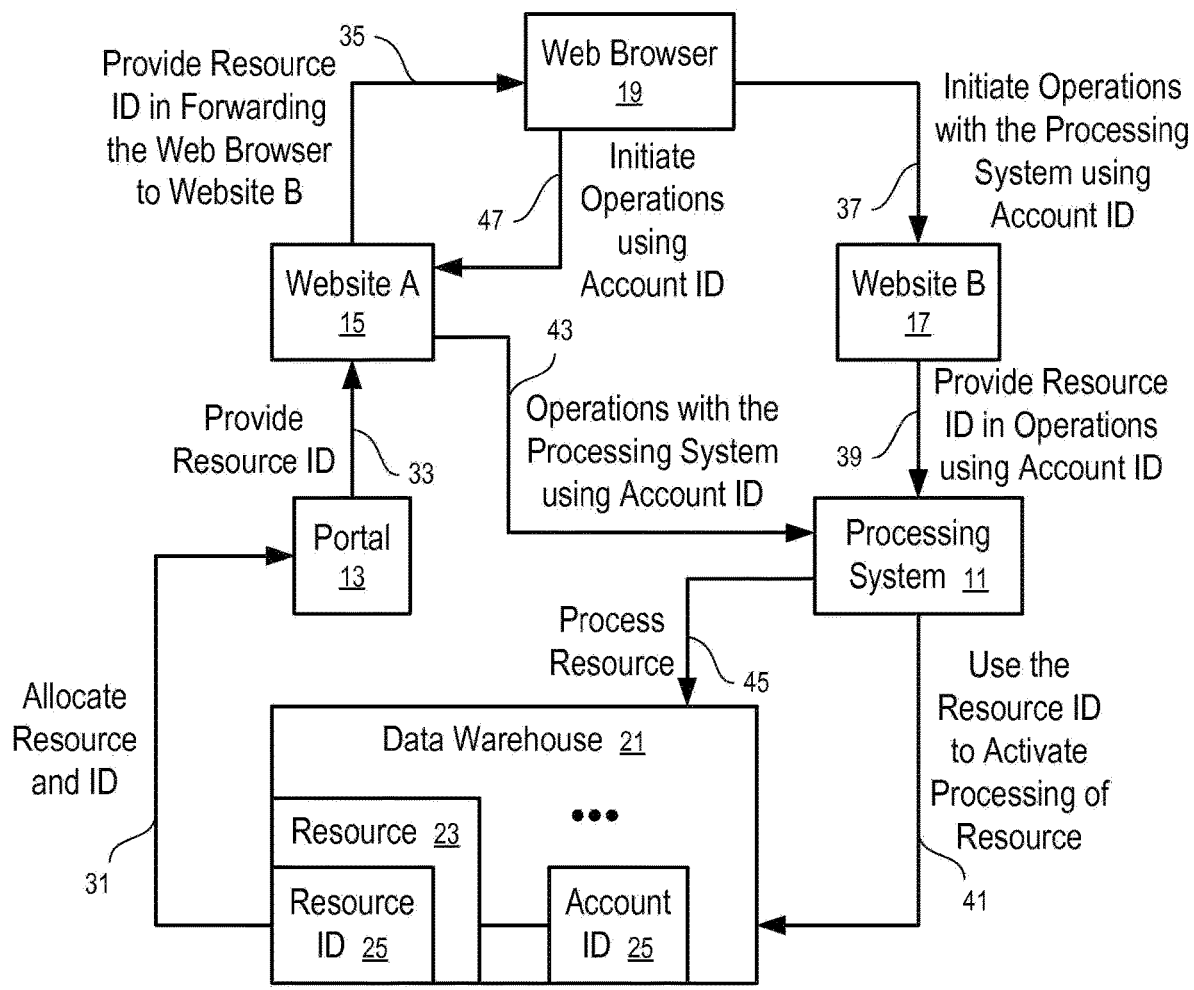
FIG. 2 shows a system configured to set up the processing of an allocated resource for processing at a time after required operations are performed at one website and during the processing of operations at another website according one embodiment.

In one embodiment, after the processing of the resource at the processing system (11) is activated, the processing system (11) is further configured to process tasks to monitor operations to detect relevant operations with the website A (15) during which the resource (23) is processed, as illustrated in FIG. 2.

FIG. 2 shows a system configured to set up the processing of an allocated resource for processing at a time after required operations are performed at one website and during the processing of operations at another website according one embodiment.

In FIG. 2, the web browser (19) initiates (37) the operations between the website B (17) and the processing system (11) using an account ID (25) configured to identified an account in the processing system (11). The operations between the website B (17) and the processing system (11) are preformed using the account identified by the account ID; and thus the account ID (25) is provided (39) with the resource ID (25) during a communication for the operations between the website B (17) and the processing system (11). In response, the processing system (11) and/or the portal (13) actives the resource (23) for processing during subsequent operations between the website A (15) and the processing system (11).

In FIG. 2, to active the resource (23) for processing, the data warehouse (21) stores the account ID (25) in association with the resource (23) identified by the ID (25). Subsequently, when the web browser (19) visits the website A (15) (e.g., after being forwarded/redirected back to the website A (15) by the website B (17), or visiting the website A (15) in a new session independent from the session with the website B (17)), the web browser (19) initiates operations between the website A (15) and the processing system (11) using the account ID (25). Since the resource (23) has been activated for processing and is associated with the account ID (25), the processing system (11) detects the communication for the operations (43) between the website A (15) and the processing system (11) using the account ID (25). Thus, during the operations (43) between the website A (15) and the processing system (11) using the account ID (25), the processing system (11) processes (45) the resource (23).

In some embodiments of FIG. 1, after the operations between the web site B (17) and the processing system (11) are performed using the account ID (25), the website B (17) forwards/redirects the web browser (19) back to the website (15) with or without indicating the resource (23). The website A (15) communicates with the portal (13) to check for available resources (e.g., 23). Since the status (27) of the resource (23) has been updated (41) to activate the resource (23) for processing, the portal (13) communicates the resource (23) to the website A (15). Thus, the website A (15) can apply the resource (23) in relevant operations between the website A (15) and the processing system (11). Such an arrangement further removes the task of monitoring and detecting the operations relevant to the resource from the processing system (11) and thus further improves the performance of the core functionalities of the processing system (11).

Figure 3:
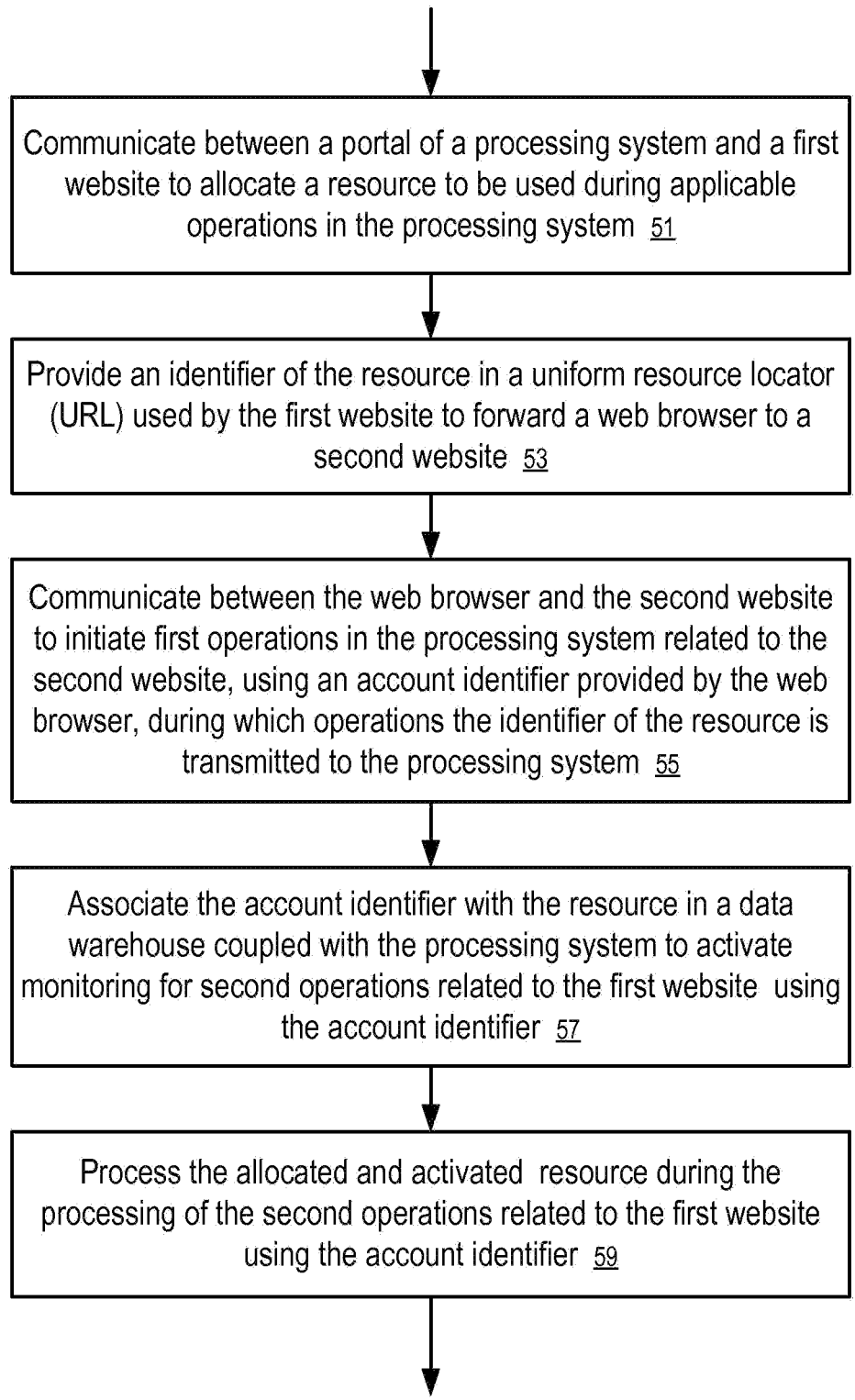
FIG. 3 shows a method to set up an operation at a computer system connected with a plurality of computer systems via a computer network using a round trip communication of an identifier of the operation according to one embodiment.

FIG. 3 shows a method to set up an operation at a computer system connected with a plurality of computer systems via a computer network using a round trip communication of an identifier of the operation according to one embodiment.

For example, the method of FIG. 3 can be implemented in a system as illustrated in FIG. 1 or FIG. 2.

In FIG. 3, a portal (13) of a processing system (11) communicates (51) with a first website (15) to allocate a resource (23) to be used during applicable operations in the processing system (11).

The portal (13) and/or the first website (15) provides (53) an identifier (25) of the resource (23) in a uniform resource locator (URL) used by the first website to forward or redirect a web browser (19) to a second website (17).

The web browser (19) communicates (55) with the second website (17) to initiate first operations in the processing system (11) related to the second website (17), using an account identifier (25) provided by the web browser (19), during which operations the identifier (25) of the resource (23) is transmitted to the processing system (11).

In response to the receiving of the identifier (25) of the resource (23) in the processing system (11) during the first operations, the processing system (11) and/or the portal (13) associate (57) the account identifier (25) with the resource (23) in a data warehouse (21) coupled with the processing system (11) to activate monitoring for second operations related to the first website (15) using the account identifier (25).

Subsequently, during the processing of the second operations related to the first website (15) using the account identifier (25), the processing system (11) processes (59) the allocated and activated resource (23).

In some embodiments, the first website (15) communicates with the portal (13) to process the allocated and activated resource (23) during the second operations related to the first website (15). In such embodiments, the processing system (11) does not have to monitoring general operations to detect the applicable second operations related to the first website (15).

The techniques discussed above in connection with FIGS. 1-3 can be used, for example, to the processing of the benefit of an offer during the operations of payment transactions processed in an electronic payment processing network.

For example, the portal (13) may communicate with the website A (15) to provide an offer that has a benefit applicable to a payment to the website A (15), after the user of the web browser (19) is referred to the website B (17) to make a payment to the website B (17) for a purchase made in the website B (17). After an identifier of the offer is transmitted through the portal (13), to the website A (15), the web browser (19), the website B (17), and back to the processing system (11) configured in the electronic payment processing network, the offer is activated for processing in a payment transaction with the website A (15), after the web browser completes the purchase from the website B (17) and proceeds with a purchase from the website A (15). The activation of the offer allows the website A (15) or the transaction processing system (11) to apply the benefit of the offer to the payment transaction with the website A (15).

In one embodiment, for example, the processing system (11) is a transaction handler of an electronic payment processing network.

In one embodiment, a system and method is configured to active an offer of a first merchant based on a payment transaction with a second merchant. The described system and method is configured to use a round-trip transmission of an offer ID to facilitate the real time activation of such an offer. The method operates by an offer platform generating a unique ID for an offer presented to a user. When the user is referred by the first merchant to the second merchant for a purchase, the unique ID is provided to the second merchant with the referral. During the payment transaction with the second merchant, the authorization request from the second merchant is configured to include the unique offer ID. The payment processing system is configured to receive the unique ID in the authorization request and provide the unique ID to the offer platform if the payment transaction is approved. Based on the real time notification from the payment processing system, the offer platform activates the offer. As a result of the system, the merchant systems are can be simply configured to support the transmission of offer IDs for reliable processing of such offers that are activated based on the payment transactions on other merchants (e.g., advertising merchants).

For example, in one embodiment, an offer system includes a hosting merchant and an advertising merchant. The hosting merchant provides an offer to a user with a benefit applicable to a purchase from the hosting merchant. The offer is activated upon the user makes a purchase from the advertising merchant that is advertised on the hosting merchant.

For example, after the offer is presented to the user, the hosting merchant may refer the user to the advertising merchant to make the purchase required to active the offer. For example, when the user is visiting the website of the hosting merchant, the offer can be presented electronically; and the user may select the offer to follow a link to a website of the advertising merchant. The link may include an identification of the offer presented to the user and request the advertising merchant to include the identification of the offer in a payment transaction made by the user as a result of the referral.

In one embodiment, the data format of authorization requests is configured to include an optional field to host the identification of the offer. When an authorization request including such an identification of the offer is received, a payment processing apparatus in the payment processing network, such as a transaction handler, an issuer processor, or an acquirer processor, can detect the transmission of the offer identification and extract the offer identification for offer processing.

For example, the extracted offer identification can be communicated to an offer platform coupled with the payment processing apparatus to activate the offer in real time with the authorization of the payment to the advertising merchant.

The authorization request of the invention can be used to activate the offer from the hosting merchant, upon completion of the transaction with the advertising merchant.

For example, once the offer is activated, the benefit of the offer can be applied to the payment made by the user to the hosting merchant.

For example, the offer of the advertising merchant may be presented to the user at the stage of the user checking out for a purchase made by the user from the hosting merchant. If the user accepts the offer, the user is directed to the advertising merchant for a purchase. If the user makes the required purchase, the identification of the offer from the offer platform and provided to the advertising merchant is provided to the payment processing apparatus via the authorization request for the payment made to the advertising merchant, and further routed to the offer platform for activation. Thus, upon completion of the purchase with the advertising merchant, the offer is activated in real time; and the user may continue the checking out process at the hosting merchant. During checking out at the host merchant, the offer platform applies the benefit of the activated offer to reduce the amount of payment required.

In some embodiments, after the offer is activated, the payment processing apparatus may provide the benefit of the offer to the user via adjusting the transaction amount specified in an authorization request for a payment account of the user, in a way as illustrated in U.S. Pat. App. Pub. No. 2013/0124287, U.S. Pat. App. Pub. No. 2013/0091000, both entitled "Systems and Methods to Provide Discount at Point of Sales Terminals", the entire disclosures of which applications are hereby incorporated herein by reference.

In one embodiment, when the benefit of the offer is not solely sponsored by the hosting merchant, the benefit of the offer can be provided to the user during the processing of the authorization of a payment transaction to the hosting merchant, in a way as illustrated in U.S. Pat. App. Pub. No. 2013/0246150, entitled "Systems and Methods to Apply the Benefit of Offers via a Transaction Handler", the entire disclosure of which application is hereby incorporated herein by reference.

In one embodiment, during the activation of the offer, a trigger record is generated for the transaction handler to detect transactions that may be relevant to the offer. The trigger record specifies a portion of the requirements a payment transaction is to meet in order to be qualified for the benefit of the offer. The transaction handler uses the trigger record to filter the transactions being processed to select a subset of transactions for further processing and determining from the subset of the transactions a relevant transaction that satisfies all of the benefit redemption requirements of the offer. The generation of the trigger record upon the receiving of the identification of the offer via an authorization request for a required payment transaction with the advertising merchant improves the performance of the transaction handler, by reducing the time period the trigger record is to be operated upon for filtering operations.

In one embodiment, systems and methods are configured to transmit, in an authorization request for a payment to a first merchant, the identification of an offer of a second merchant. During the processing of the authorization request for the first merchant, the identification of the offer of the second merchant is extracted. The extracted offer identification can be used to active the offer in response to the authorization of the payment to the first merchant.

Figure 4:
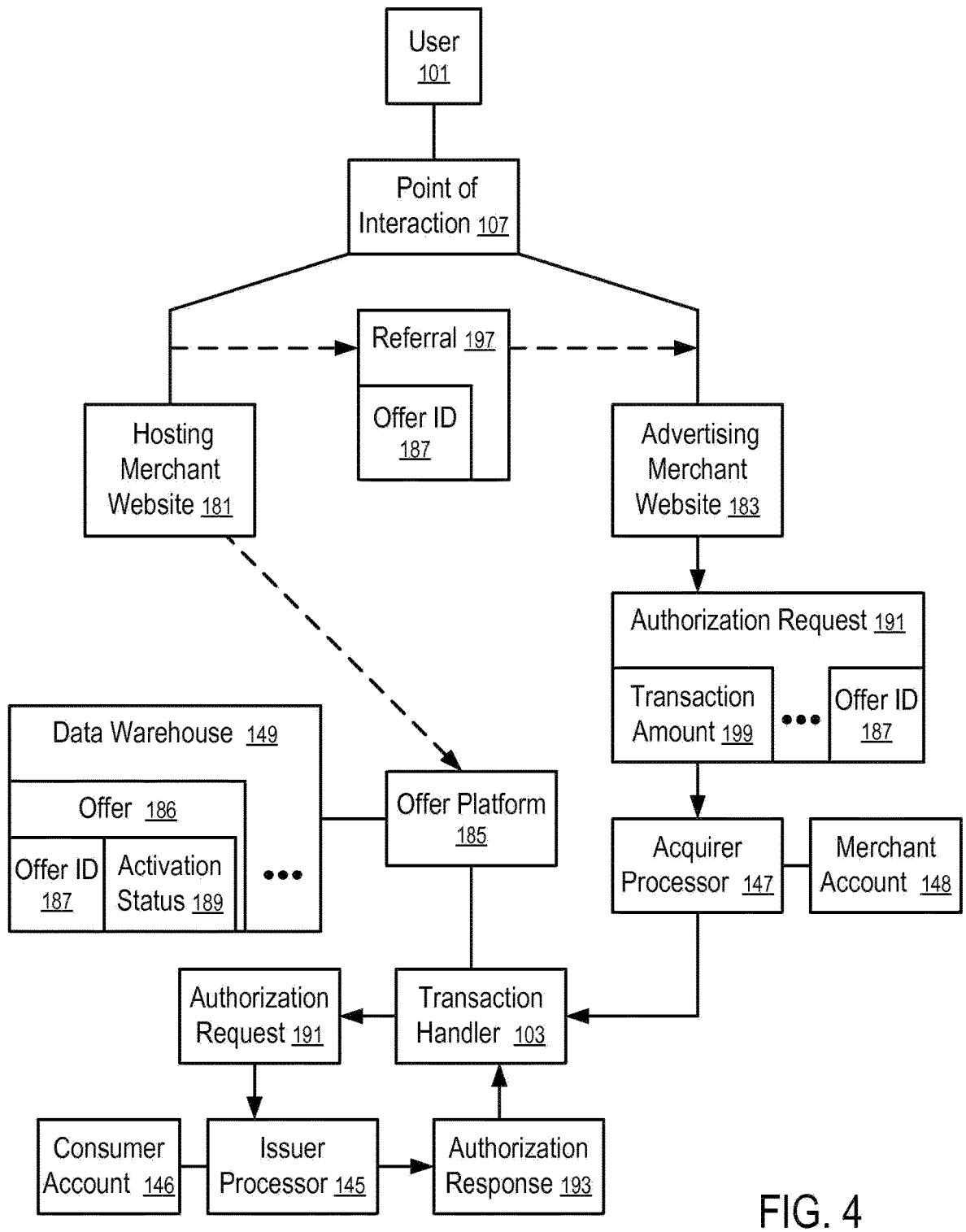
FIG. 4 shows a system to activate an offer according to one embodiment.

FIG. 4 shows a system to activate an offer according to one embodiment.

In FIG. 4, an offer platform (185) is coupled with a hosting merchant website (181) to present offers (e.g., 186) of the hosting merchant, and to apply the benefits of offers.

For example, the offer platform (185) may be integrated with an electronic shopping cart system running on the hosting merchant website (181). In response to the user (101) making a purchase from the hosting merchant via the point of interaction (107), the offer platform (185) may present an offer (186) of an advertising merchant (183) that is generally different from the hosting merchant, but may be the same as the hosting merchant in some instances.

For example, the offer platform may select the offer (186) based on the purchases made by the user (101) and/or the transaction profile (e.g., 131) of the user (101) when the identity of the user (101) is determined.

When the offer (186) presented on the hosting merchant website (181) is selected by the user (101), via the use of the point of interaction (107), such as a web browser running in a user computing device, the hosting merchant website (181) is configured to refer the user (101) to the advertising merchant website (183). The referral (197) includes the offer ID (187) of the offer (186), which uniquely identifies the offer (186) presented on the hosting merchant website (181) to the user (101), among various offers provided by the offer platform (185).

In one embodiment, the referral (197) is configured to serve as a request to transmit the offer ID (187) in an authorization request (e.g., 191) for a payment made by the user (101) as a result of the referral (197).

After the user (101) is referred to the advertising merchant website (183), the user (101) may make a required purchase (or any purchase) from the advertising merchant website (183).

For example, in one embodiment, the requirement of the purchase for activating the offer (186) can be satisfied by any purchase. Alternatively, a predetermined purchase requirement may be established based on a spending threshold, a category of items purchased, etc. In some embodiments, the requirement can be transmitted to the advertising merchant website via the referral (197). In other embodiments, the advertising merchant website (183) may look up the requirements from the offer platform using the offer ID (187). In further embodiments, the requirement is formulated based on information transmitted via the authorization request (191), such as the transaction amount (199), the date and time of the transaction, purchase details (e.g., identifications of items purchased) transmitted in the authorization request (191), etc.

In FIG. 4, when the user makes a purchase from the advertising merchant website as a result of the referral (197), the advertising merchant website (183) is configured to include the offer ID (187) in the authorization request (191) for the payment transaction to payment the advertising merchant.

In FIG. 4, the payment transaction is between the consumer account (146), issued to the user (101) and controlled by the issuer processor (145), and the merchant account (148) controlled by the acquirer processor (147) on behalf of the advertising merchant.

Figure 6:
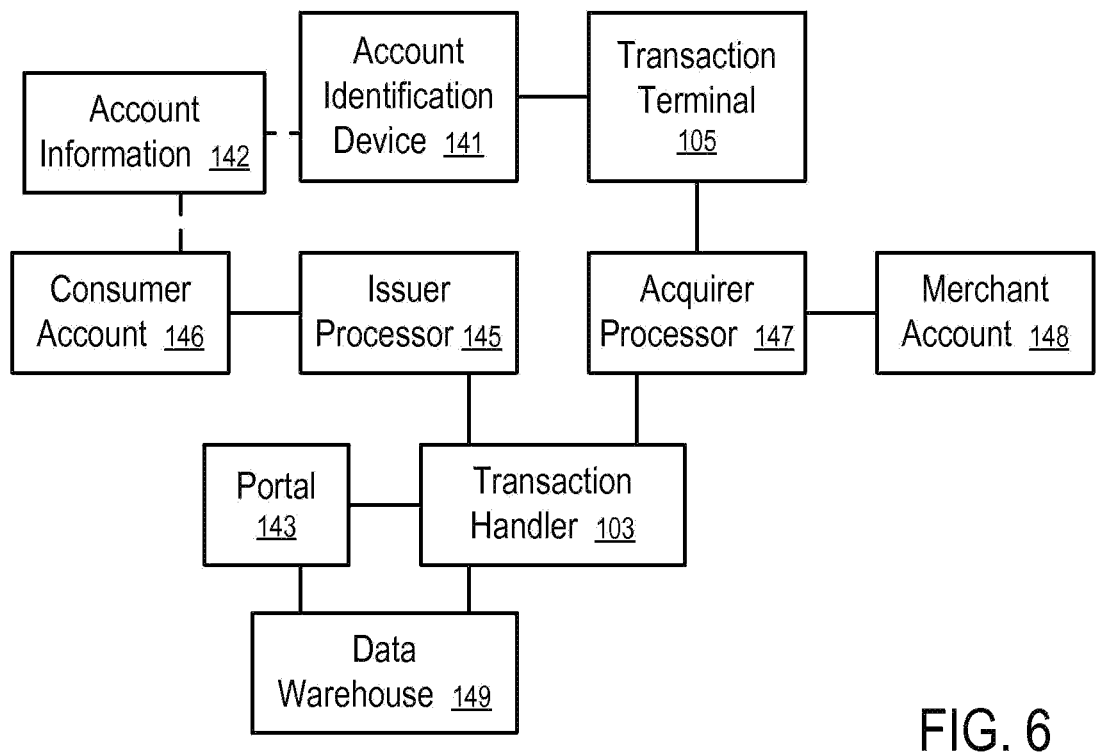
FIG. 6 shows a system to provide information based on transaction data according to one embodiment.

The transaction handler (103) of the payment processing network (e.g., as illustrated in FIG. 6) is configured to route the authorization requests (e.g., 191) to the respective issuer processors (e.g., 145) that controls the respective payment accounts (e.g., 146) and route the corresponding authorization responses (e.g., 195) back to the respective acquirer processors (e.g., 147) of the merchants.

In FIG. 4, the offer platform (185) is coupled with the transaction handler (103) to obtain the offer ID (187) transmitted in the authorization request (191). In response to the offer ID (187) transmitted in the authorization request (191), the offer platform (185) updates the activation status (189) of the offer (186) to activate the offer (186) for benefit redemption.

Thus, in response to the authorization response (195) for the payment transaction requested by the authorization request (191), the transaction handler (103) and the offer platform (185) activates the offer (186), such at the use (101) can obtain the benefit of the offer (186) as soon as the payment transaction is approved.

For example, the offer platform (185) may be integrated with the electronic shopping cart system running on the hosting merchant website (181). Once the offer (186) is activated, the electronic shopping cart system automatically shows the discount provided by the offer (186), and the user (101) can verify the benefit before committing a payment to the hosting merchant website (181) and/or finalizes the purchase from the hosting merchant website (181).

FIG. 4 illustrates the use of the offer ID transmitted in the authorization request, transmitted for a payment to the advertising merchant, to activate the offer (186) from a different merchant (e.g., the hosting merchant (181)). The system can also be used to activate an offer of the same advertising merchant.

Figure 9:
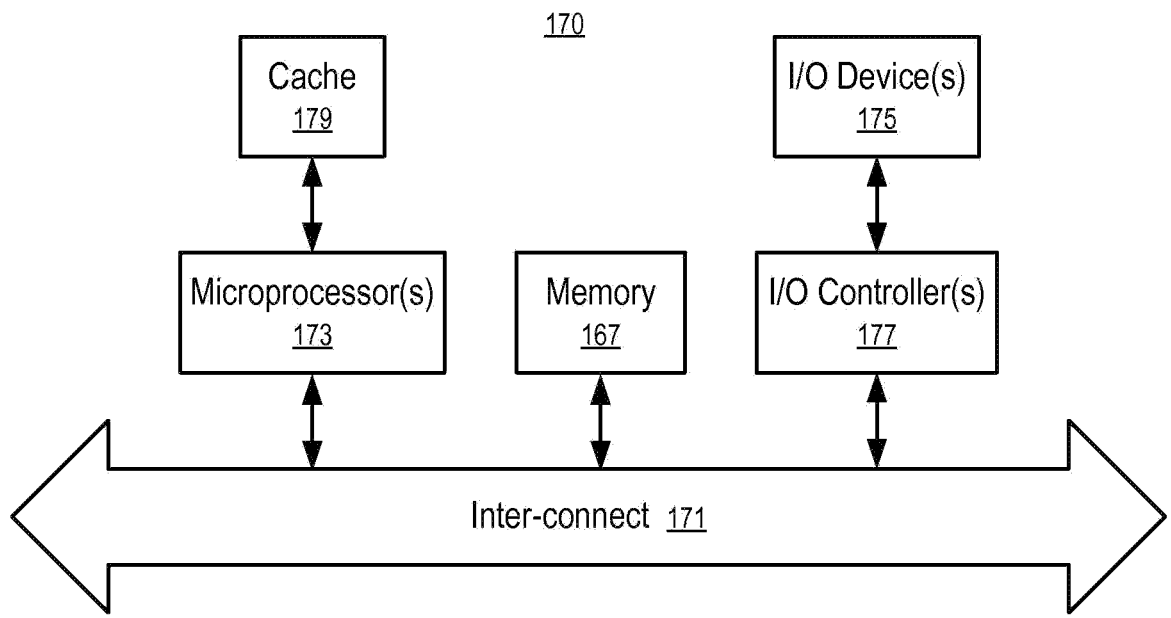
FIG. 9 illustrates a data processing system according to one embodiment.

In one embodiment, one or more of the components illustrated in FIG. 4, such as the transaction handler (103), the offer platform (185), the data warehouse (149), the issuer processor (145), the acquirer processor (147), the hosting merchant website (181), the advertising merchant website (183), and/or the point of interaction (107), is implemented using one or more data processing systems, such as a data processing system illustrated in FIG. 9.

In one embodiment, an offer system is configured to present an online offer for qualified consumer that depends on the completion of another online purchase. The authorization request (191) containing the offer ID (187) can be used to verify accurately and immediately upon the authorization of the payment transaction for the online purchase required for the offer redemption.

For example, a consumer is shopping on Ticketmaster.com and adds 2 concert tickets to their shopping cart. On the Check-out page, the consumer is offered 25% discount (Ticketmaster gets the offer from the offer platform) on their ticket purchase if he/she spend $50 or more at Macys.com. The offer platform generates an OfferId (e.g., "1K2CGP9") to uniquely identify the offer presented to the consumer, among similar offers presented to other consumers shopping on Ticketmaster.com. After the consumer accepts the offer by clicking on the offer, the consumer is redirected to Macys.com with an indication of "OfferId=1K2CGP9" in the referral. The consumer submits a payment made using a payment account (e.g., a credit account, a debit account, a prepaid account) for a purchase of $55 at Macys.com. Macys.com sends an authorization request with OfferId=1K2CGP9 to the transaction handler via a respective acquirer of Macys.com. Once the Transaction is authorized, the transaction handler sends the authorization details with the OfferId=1K2CGP9 to the offer platform, which Activates the 25% discount at ticketmaster.com. After the consumer returns or is redirected back to the TicketMaster.com's check-out page. Once the consumer submits the payment made using a payment account (e.g., a credit account, a debit account, a prepaid account) for the purchase of the 2 concert tickets, TicketMaster.com sends the authorization request for the payment of the concert tickets with OfferId=1K2CGP9. The transaction handler discounts the transaction amount 25% by reducing transaction amount requested from the issuer processor of the payment account of the consumer. Thus, the consumer pays the reduced amount that includes the 25% discount.

In one embodiment, the discount provided by the hosting merchant (e.g., TicketMaster.com) is sponsored at least in part by the advertising merchant (e.g., Macys.com). The transaction handler (103) is configured to charge the merchant account (148) to compensate the hosting merchant for the portion of the discount sponsored by the advertising merchant and/or the advertising fee for presenting the offer (186).

In one embodiment, the authorization request (191) containing the offer ID (187) can also be used to track the completion of purchases resulting from an offer.

For example, advertising merchants want to present offers/advertisements to online shoppers while they are browsing, or shopping on, the websites of other merchants. Merchants operating the hosting websites that present the offers are compensated (e.g., by the advertising merchants) if a presented offer has been completed.

In one embodiment, after the offer (186) of an advertising merchant is presented, via the offer platform (185), on the website (181) of a hosting merchant, the offer platform (185) stores in the data warehouse (149) the offer ID (187) in association with the hosting merchant website (181). After the user (101) is redirected, via the referral (197) that contains the offer ID (187), to the advertising merchant website (183), the advertising merchant website (183) is configured to transmit the offer ID (187) in the authorization request (191) for a payment transaction made as a result of the referral (197). In response to the authorization request (191) contains the offer ID (187), the transaction handler (103) is configured to provide the benefit of the offer to the user via the processing of the payment transaction in the consumer account (146) of the user (101), in a way as discussed above and further described in U.S. Pat. App. Pub. No. 2013/0124287, U.S. Pat. App. Pub. No. 2013/0091000, both entitled "Systems and Methods to Provide Discount at Point of Sales Terminals", and U.S. Pat. App. Pub. No. 2013/0246150, entitled "Systems and Methods to Apply the Benefit of Offers via a Transaction Handler", the entire disclosures of which applications are hereby incorporated herein by reference.

In one embodiment, based on the data associating the offer ID (187) with the hosting merchant website (181) in the data warehouse (149) and in response to the authorization request (191) containing the offer ID (187), the offer platform (185) and/or the transaction handler (103) is configured to compensated the hosting merchant for presenting the offer (186).

In one embodiment, the compensation provided to the hosting merchant is in response to an authorization response (193) approving the payment transaction requested by the authorization request (191). In some embodiments, the transaction handler (103) is configured to redirect a portion of the payment requested by the authorization request (191) to compensate the hosting merchant.

For example, the transaction handler (103) may generate a companion transaction to pay the hosting merchant using an account of the advertising merchant in response to the redemption of the offer (186) identified by the authorization request (191).

For example, the transaction handler (103) may split the payment from the consumer account (146) into a first payment to the merchant account (148) in response to the authorization request (191) and a second payment to an account of the hosting merchant website (181) to compensate the hosting merchant. The transaction handler (103) combines the two payments as a single payment transaction in the consumer account (146). The transaction handler (103) and/or the offer platform (185) is configured to inform the advertising merchant of the compensation provided to the hosting merchant website (181). For example, in one embodiment, the transaction handler (103) is configured to insert an indication of an advertising fee charged for the offer ID (187) in an authorization response provided to the advertising merchant website via the acquirer processor (147). For example, the authorization response (193) approving the authorization request (191) may include the offer ID (187) to indicate that a difference between the requested transaction amount (199) and the approved transaction amount has been provided to the hosting merchant website (181) as the compensation for the presentation of the offer (186) of the advertising merchant.

In some embodiments, the advertising merchant website (183) is configured to provide the benefit of the offer (186) to the user (101) (e.g., by reducing the total price, offer one or more items free of charge) and use the offer ID (187) in the authorization request (191) to report the completion of the offer (186). In response to the offer ID (187) provided in the authorization request (191), the offer platform (185) deactivates the offer (186) and/or compensates the hosting merchant website (181).

The systems discussed above in connection with FIGS. 1-4 can further include other enhancements as discussed below.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities.

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions can be found in U.S. Pat. No. 8,359,274, the disclosure of which is hereby incorporated herein by reference.

For example, the computing apparatus can be programmable for real-time interaction with users to provide messages and/or offers, validate fulfillment conditions, and provide benefits to qualified users to fulfill the offers. In one embodiment, the computing apparatus is configured to be programmed via accepting definitions of independent events and linking the events via prerequisite requirements to specify qualification conditions. The linked events form a flow or network of events; and user progress in the flow or network of events is tracked. The operations for each event are performed in an atomic way to allow the user positions in the flow or network of events to be identified as being in between adjacent events in the network. As a result, the programming of the real-time interaction, including the offer rules and messages, can be easily modified during the execution of the programming. Details in one embodiment regarding the formulation and management of real-time interaction can be found in U.S. Pat. App. Pub. No. 2012/0078697, the disclosure of which is hereby incorporated herein by reference.

For example, the computing apparatus can be configured to allow a user to use any of a plurality of registered accounts to participate in an offer campaign, such as performing transactions in the registered accounts to fulfill requirements to obtain the benefit of the offer campaign. In one embodiment, the offer campaign is programmed by offer rules that identify the real time interactions with the user in response to the actions of the user, such as transactions made using any of the registered accounts of the user. The offer campaign for the user is driven at least in part by the actions of the user, such as the transactions made by the user. In one embodiment, transactions in the registered accounts of the user jointly advances the offer campaign for the user; and a milestone achieved in the offer campaign using one account of the user is recognized as a milestone achieved by the user with respect to the multiple registered accounts. Thus, the offer campaign for the user can be advanced by the user via different accounts, as if the registered accounts were a same account; and the user is not limited to using a particular account to participate in the offer campaign, nor using different accounts to drive the offer campaign separately, as if the accounts were assigned to different users. Details in one embodiment regarding the configuration of real time interactions using multiple accounts of a user can be found in U.S. Pat. App. Pub. No. 2014/0074575, the disclosure of which is hereby incorporated herein by reference.

In one embodiment, the computing apparatus is configured to target the same offer differently to users based on the media channels used to deliver the offer. An offer can be configured to include first qualification conditions formulated based on triggering events, such as the current location of a user, the current transaction of the user as being processed by a transaction handler, and second qualification conditions not based on such triggering events. To users reachable via a first set of media channels, the first qualification conditions are ignored in selecting candidate users for the delivery of the offer; and the candidate users are selected based on the second qualification conditions. If the offer has not be delivered to a user via the first set of media channels, the computing apparatus is configured to deliver the offer to the user via a second set of media channels, when the user satisfies both the first qualification conditions and the second qualification conditions. Details in one embodiment can be found in U.S. Pat. App. Pub. No. 2014/0074599, the disclosure of which is hereby incorporated herein by reference.

In one embodiment, a system and method is configured to allow an offer campaign to be specified based on requirements of transactions with multiple merchants. Details in one embodiment can be found in U.S. Pat. App. Pub. No. 2014/0129313, the disclosure of which is hereby incorporated herein by reference.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

Figure 5:
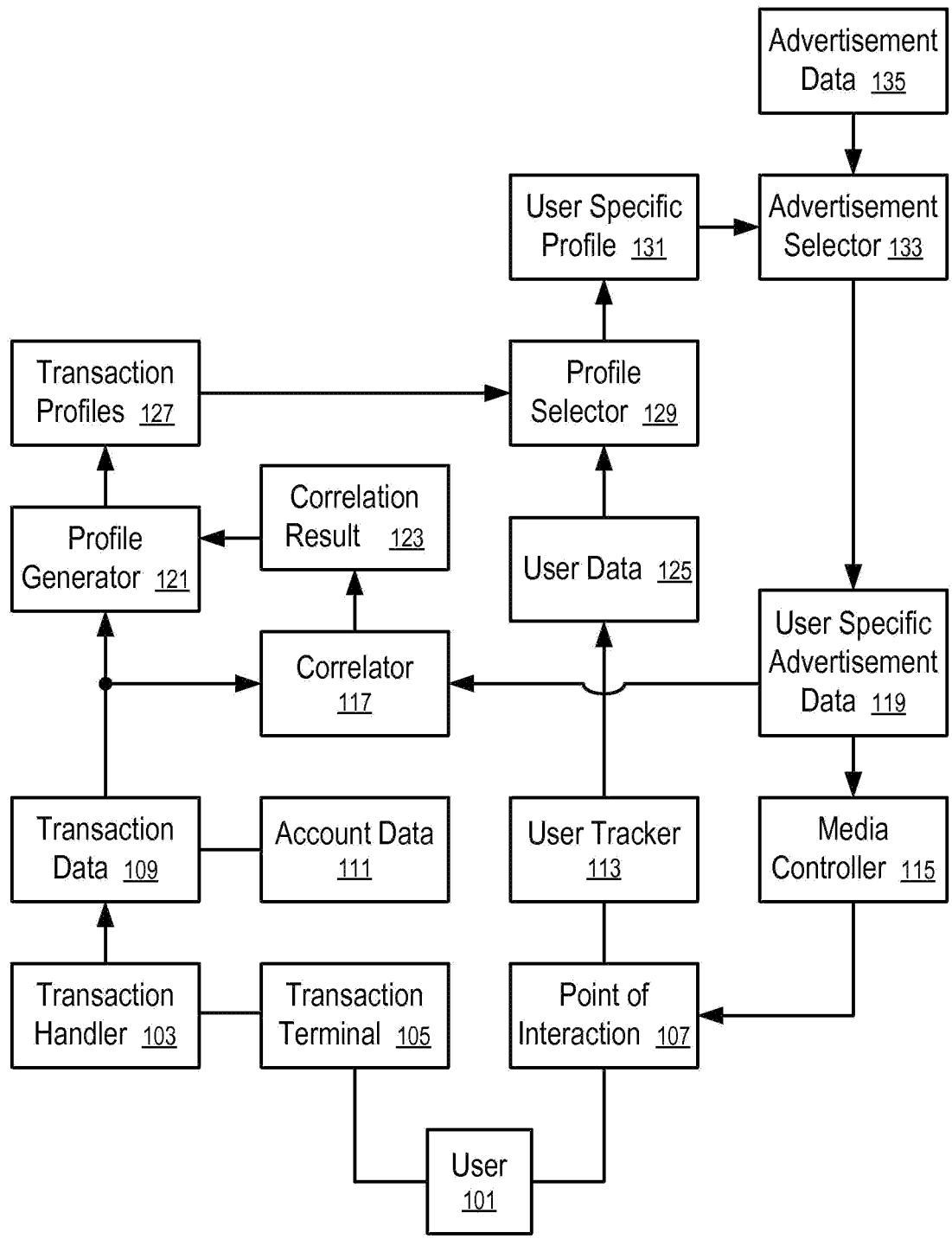
FIG. 5 illustrates a system to provide services based on transaction data according to one embodiment.

FIG. 5 illustrates a system to provide services based on transaction data according to one embodiment. In FIG. 5, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 5, the system further includes a correlator (117) to correlate user specific advertisement data (119) with transactions resulting from the user specific advertisement data (119). The correlation results (123) can be used by the profile generator (121) to improve the transaction profiles (127).

In one embodiment, a data warehouse (149) as illustrated in FIG. 6 is coupled with the transaction handler (103) to store the transaction data (109) and other data, such as account data (111), transaction profiles (127) and correlation results (123). In FIG. 6, a portal (143) is coupled with the data warehouse (149) to provide data or information derived from the transaction data (109), in response to a query request from a third party or as an alert or notification message.

In FIG. 6, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 7:
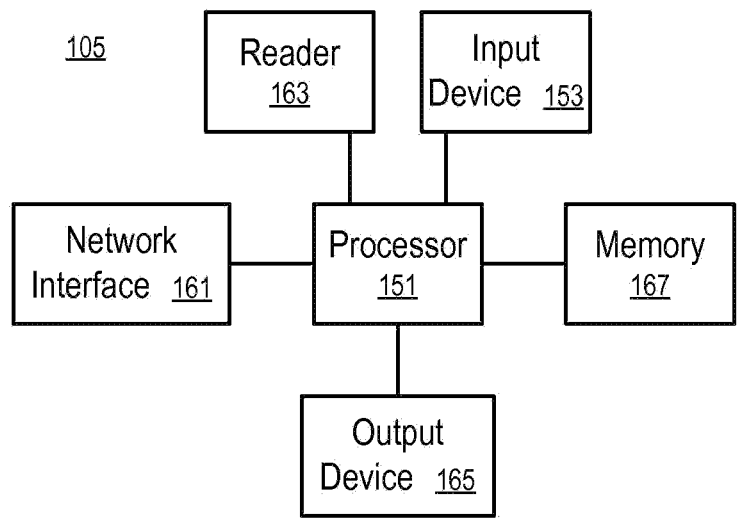
FIG. 7 illustrates a transaction terminal according to one embodiment.
Figure 8:
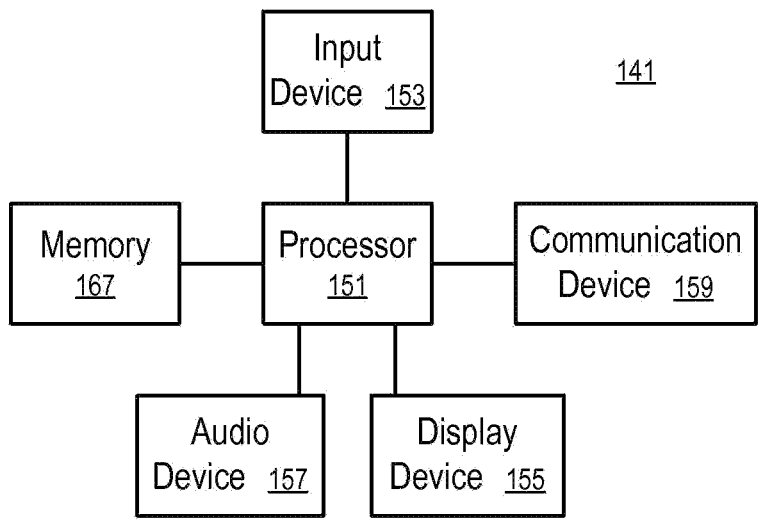
FIG. 8 illustrates an account identifying device according to one embodiment.

FIGS. 7 and 8 illustrate examples of transaction terminals (105) and account identification devices (141). FIG. 9 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 5-9, and other figures.

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile Based Operations

In FIG. 5, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. App. Pub. No. 2011/0054981, entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

In FIG. 5, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile. As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile is used to provide intelligence information about the spending patterns, preferences, and/or trends of the user (101). For example, a predictive model can be established based on the aggregated spending profile to estimate the needs of the user (101). For example, the factor values and/or the cluster ID in the aggregated spending profile can be used to determine the spending preferences of the user (101). For example, the channel distribution in the aggregated spending profile can be used to provide a customized offer targeted for a particular channel, based on the spending patterns of the user (101). Further details about aggregated spending profile can be found in U.S. Pat. App. Pub. Nos. 2010/0306029 and 2010/0306032, the disclosures of which applications are here by incorporated herein by reference.

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. Pat. App. Pub. No. 2008/0201226, entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. Pat. App. Pub. No. 2008/0082418, entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery," the disclosures of which applications are hereby incorporated herein by reference.

Transaction Processing and Data

FIG. 6 shows a system to provide information and/or services based on transaction data (109) according to one embodiment.

In FIG. 6, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127), aggregated spending profile, offer redemption notification, etc. The portal (143) may be implemented as a web portal, a telephone gateway, a file/data server, etc.

In FIG. 6, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 6, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 6, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 6, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 6, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Examples and techniques in one embodiment are provided in U.S. Pat. App. Pub. No. 2007/0055597, entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 7 illustrates a transaction terminal according to one embodiment. The transaction terminal (105) illustrated in FIG. 7 can be used in various systems discussed in connection with other figures of the present disclosure. In FIG. 7, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147)

via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 7. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 7. For example, in one embodiment, the transaction terminal (105) is an ATM machine, which includes components to dispense cash under certain conditions.

Account Identification Device

FIG. 8 illustrates an account identifying device according to one embodiment. In FIG. 8, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 8, such as a cellular communications subsystem.

In one embodiment, the communication device (159) may access the account information (142) stored on the memory (167) without going through the processor (151).

In one embodiment, the account identification device (141) has fewer components than those illustrated in FIG. 8. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 9, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 9. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 9, with more or fewer components.

In one embodiment, the transaction handler (103) is a payment processing system, or a payment card processor, such as a card processor for credit cards, debit cards, etc.

FIG. 9 illustrates a data processing system according to one embodiment. While FIG. 9 illustrates various components of a computer system, it is not intended to represent any particular architecture or manner of interconnecting the components. One embodiment may use other systems that have fewer or more components than those shown in FIG. 9.

In FIG. 9, the data processing system (170) includes an inter-connect (171) (e.g., bus and system core logic), which interconnects a microprocessor(s) (173) and memory (167). The microprocessor (173) is coupled to cache memory (179) in the example of FIG. 9.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:

storing, by a communication portal server in a data warehouse, an identifier of the resource in association with the resource;

communicating, by the communication portal server, the identifier of the resource to a first merchant website;

receiving, by a web browser, the identifier of the resource from the first merchant website;

after receiving the identifier of the resource, redirecting, by the web browser, from the first merchant website to a second merchant website;

receiving, by the second merchant website, the identifier of the resource from the web browser during the redirecting from the first merchant website;

initiating, by the web browser, a first transaction with the second merchant website using the identifier of the resource;

communicating, by the second merchant website, a first authorization request message for the first transaction to at least one transaction handler computer, the first authorization request message comprising the identifier of the resource, wherein the at least one transaction handler computer is configured to process transactions, and wherein the communication portal server is configured to communicate with websites using communication channels independent of communications of the at least one transaction handler computer for the transactions;

extracting, by the at least one transaction handler computer, the identifier of the resource from the first authorization request message;

activating, by the at least one transaction handler computer, the resource stored in the data warehouse in response to authorization and completion of the first transaction and extracting the identifier of the resource from the first authorization request message and completion of the first transaction;

redirecting, by the web browser, from the second merchant website to the first merchant website after the resource stored in the data warehouse is activated;

initiating, by the web browser, a second transaction with the first merchant website;

communicating, by the first merchant website, a second authorization request message for the second transaction to the at least one transaction handler computer, wherein the second authorization request message includes the identifier of the resource;

applying, by the at least one transaction handler computer, the resource to the second transaction in response to receiving the second authorization request message, wherein the resource includes a benefit of an offer applicable to the second transaction from the first merchant website after the first transaction from the second merchant website, wherein the second authorization request message including the identifier of the resource is used to track completion of the second transaction resulting from applying the benefit of the offer to the second transaction; and communicating, by the at least one transaction handler computer, with an issuer processor to authorize the second transaction based on applying the benefit of the offer to the second transaction.

2. The method of claim 1, wherein, in response to activation of the resource, the at least one transaction handler computer detects the second authorization request message for the second transaction.

3. The method of claim 1, wherein the identifier of the resource is embedded in a uniform resource locator used to redirect the web browser from the first merchant website to the second merchant website.

4. The method of claim 1, wherein the at least one transaction handler computer is on an electronic payment processing network in which the at least one transaction handler computer interconnects issuer processors controlling first accounts from which payments are made and acquirer processors controlling second accounts to which the payments are made.

5. The method of claim 4, wherein activating further comprises:

storing a trigger record in the data warehouse, the trigger record identifying a subset of conditions for redemption of the benefit in the second transaction; and monitoring, by the at least one transaction handler computer, authorization request messages transmitted in the electronic payment processing network to identify, using the trigger record, the second transaction.

6. A system, comprising:
a web browser;
a first merchant website;
a second merchant website;
a communication portal server; and
at least one transaction handler computer;
the communication portal server configured to:
store, in a data warehouse, an identifier of the resource in association with the resource;
communicate the identifier of the resource to the first merchant website;

the web browser configured to:
receive the identifier of the resource from the first merchant website;
after receiving the identifier of the resource, redirect from the first merchant website to the second merchant website; and
initiate a first transaction with the second merchant website using the identifier of the resource;

the second merchant website configured to:
receive the identifier of the resource from the web browser during the redirecting from the first merchant website; and
communicate a first authorization request message for the first transaction to the at least one transaction handler computer, the first authorization request message comprising the identifier of the resource, wherein the at least one transaction handler computer is configured to process transactions, and wherein the communication portal server is configured to communicate with websites using communication channels independent of communications of the at least one transaction handler computer for the transactions;

the at least one transaction handler computer configured to:
extract the identifier of the resource from the first authorization request message; and
activate the resource stored in the data warehouse in response to authorization and completion of the first transaction and extracting the identifier of the resource from the first authorization request message and completion of the first transaction;

the web browser further configured to:
redirect from the second merchant website to the first merchant website after the resource stored in the data warehouse is activated; and
initiate a second transaction with the first merchant website;

the first merchant website configured to:
communicate a second authorization request message for the second transaction to the at least one transaction handler computer, wherein the second authorization request message includes the identifier of the resource;

the at least one transaction handler computer further configured to:
apply the resource to the second transaction in response to receiving the second authorization request message, wherein the resource includes a benefit of an offer applicable to the second transaction from the first merchant website after the first transaction from the second merchant website, wherein the second authorization request message including the identifier of the resource is used to track completion of the second transaction resulting from applying the benefit of the offer to the second transaction; and
communicate with an issuer processor to authorize the second transaction based on applying the benefit of the offer to the second transaction.

7. The system of claim 6, wherein, in response to activation of the resource, the at least one transaction handler computer detects the second authorization request message for the second transaction.

8. The system of claim 6, wherein the identifier of the resource is embedded in a uniform resource locator used to redirect the web browser from the first merchant website to the second merchant website.

9. The system of claim 6, wherein the at least one transaction handler computer is on an electronic payment processing network and interconnects issuer processors controlling first accounts from which payments are made and acquirer processors controlling second accounts to which the payments are made.

10. The system of claim 6, wherein during activation of the resource, the data warehouse stores a trigger record, the trigger record identifying a subset of conditions for redemption of the benefit in the second transaction; and the at least one transaction handler computer monitors authorization request messages transmitted in the electronic payment processing network to identify, using the trigger record, the second transaction.

* * * * *